Nov. 13, 1956 R. C. TURTLE 2,770,454
DRIVE CONTROL AND TRANSMISSION MECHANISM
Filed Oct. 26, 1954 6 Sheets-Sheet 6

FIG. 11.

Inventor
Rupert Clifford Turtle,
By
Pierce, Scheffler & Parker
his Attorneys

United States Patent Office 2,770,454
Patented Nov. 13, 1956

2,770,454

DRIVE CONTROL AND TRANSMISSION MECHANISM

Rupert Clifford Turtle, East Croydon, England, assignor to Arens Controls Limited, East Croydon, England, a British company Application October 26, 1954, Serial No. 464,817

Claims priority, application Great Britain November 2, 1953

8 Claims. (Cl. 268—21)

This invention is concerned with improvements in or relating to drive control and transmission mechanism for generating reciprocatory and angular movement of a reciprocable and angularly movable member, e. g. a window stay and has for one of its objects to provide improved mechanism which can be actuated by flexible cables or the like from a control station.

Control and transmission mechanism according to the present invention comprises a pivotally mounted carriage, a bar or the like mounted for longitudinal reciprocation with respect to said carriage, an idling pulley or the like mounted for rotation about the pivotal axis of the said carriage, cables extending from the ends of said bar and passing in opposite directions around said pulley for engagement with means for selectively applying a pull to either of said cables, and means for preventing pivotal movement of said carriage excepting when said bar or the like is in or closely adjacent to a predetermined position within its range of longitudinal reciprocatory movement with respect to said carriage and for preventing reciprocation of said bar or the like with respect to said carriage excepting when the said carriage is in or closely adjacent to a predetermined position within its range of pivotal movement, the arrangement being such that a pull on one of the cables can only cause angular movement of said carriage and said bar or the like about the pivotal axis of the carriage when the bar or the like is in or closely adjacent to the first-mentioned pre-determined position and can only cause relative reciprocation between said carriage and said bar or the like when the carriage is in or closely adjacent to the second-mentioned pre-determined position.

Control mechanism in accordance with the present invention may comprise a single carriage and bar assembly, e. g. for operating a single window or it may comprise a series of such assemblies, e. g. for operating a bank of windows. In the former case the aforesaid cables extending from the respective ends of the bar or the like may lead to actuating mechanism, e. g. a winch or the like or they may lead to a position where a direct pull can be applied by an operator. In cases where the mechanism includes a plurality of carriage and bar assemblies there may be separate actuating means for each pair of cables or there may be common actuating means for simultaneously operating all of the carriage and bar assemblies. Thus for instance one cable may extend from the end of one of the bars of the series of bars to a control station, the second cable from that bar may extend to the bar of the next carriage and bar assembly and so on throughout the whole series, the second cable from the last assembly in the series extending to the said control station. That is to say, actuation of one of the assemblies in one sense is effected directly by pulling on a cable at the control station and actuation of that assembly in the opposite sense is effected indirectly from the control station through actuation of another assembly. In another method of effecting simultaneous operation of a plurality of assemblies two cables only may extend from the control station to one of the assemblies and connection to the other assembly or assemblies may be effected by branch cables attached at appropriate points to said two cables extending from the control station. In all cases concerned with the operation of a plurality of carriage and bar assemblies it is preferred that the various cables, apart of course from those parts associated with individual bars, should extend through a common housing.

The pivotal axis of the aforesaid carriage and the pivotal axis of the aforesaid bar or the like are so disposed that they are concentric when the bar or the like is at one of the limits of its reciprocatory movement with respect to the carriage but eccentric in all other positions and it will be appreciated that only in the said position of concentricity can the bar and carriage undergo angular movement. In all other positions a pull on the actuating cables can only effect relative reciprocation between the bar and its carriage.

Control mechanism according to the present invention is particularly suitable for controlling either top hung or bottom hung windows. In the former case it will unually be desirable for the aforesaid arm or the like to be pivoted to the window and for the carriage to be pivoted on the window frame or some part fixed thereto, whilst in the case of bottom hung windows it will usually be desirable for the bar to be pivoted to the window frame and for the carriage to be pivoted to the window. In the latter case the adjacent parts of the transmission means have to swing with the window but this movement can be readily accommodated by the aforesaid cable transmission means.

The aforesaid pivotal mounting of the bar or the like may provide for rocking movement about an axis at right-angles to the said pivotal movement, e. g. the bar may be connected to a hinged bracket by means of a pivot pin or an arcuate arm of circular cross-section may extend from said bar through an eyelet element mounted on the part with respect to which there is to be provision for pivotal and rocking movement.

The aforesaid cables employed in carrying out the present invention may be of various kinds but it is at present preferred that there should be an assembly comprising two flexible tubes made from helically coiled galvanised wire of flat section moulded into a single casing of plastic material, e. g. polyvinyl chloride, said tubes forming housings for the respective cables which may for instance be of multi-stranded wire. Such assembly can be easily cut to length, washed or painted and its fitting does not require the use of any bending tools.

In cases where the aforesaid cables consist of stranded wire, the construction is preferably such that unravelling is opposed even when such cable is cut, and in order to prevent any possibility of a strand being caught up when the cable is being threaded through its conduit an expandable thimble may be fitted to the leading end of such cable, such thimble being for instance of thin material so that it can be secured merely by crimping its walls for instance by means of cutting nippers.

In cases where control mechanism in accordance with the present invention is applied to the actuation of an angularly movable window it is preferred to provide for the aforesaid bar or the like being able to swing from its window-actuating position through a position parallel to the window frame to a position in which its free end is closer to the frame than is the pivoted end, this arrangement usually necessitating provision for the bar or the like swinging through an angle of rather more than 90° after sliding to a position corresponding to the fully closed position of the window. If desired a resilient stop may be provided for the bar or the like when it reaches its nested or fully closed position and it will be appreciated that when the bar or the like is in that position it is impossible for the window to be opened by any force in an opening direction short of that which breaks the structure, such locking being effective even if the control cables are broken or removed, although hand manipulation is, of course, still possible by first swinging the bar or the like into a position in which its slideway is located in the line of the opening movement.

In cases where the two actuating cables extending from the control station are driven by a rotary winch, such winch may be of any suitable kind but it is at present preferred to employ a rotary drum assembly driven for instance by worm and worm wheel gearing, the two cables being anchored to the drum assembly, preferably detachably, and if desired there may be provision for anchoring the cables in a selected one of two or more positions with respect to the rotary assembly. It will of course be appreciated that the said cables are disposed for being wound around the drum assembly in opposite directions so that within the range of the device rotation of the assembly results in one cable being paid out as the other is drawn in. In order to prevent the said cables being subjected to undue tension pursuant to any attempt to overwind the winch beyond a position in which one cable has been fully paid out, positive stops may be provided for arresting movement of the drum beyond pre-determined limiting positions. In general it will be desirable for the drum assembly to be rotatable through more than one revolution and the said stops must provide for such range of movement. In order to achieve this the stop mechanism may comprise two oppositely actuating pawls, one for arresting motion of the drum assembly in one direction and the other for arresting motion in the other direction, the notches for co-operation with said pawls being located in those zones of the rotary assembly on which the cables are or are to be wound with the result that whenever there is more than one convolution of a cable in a zone the associated pawl is prevented from engaging the notch and the cable can accordingly be freely paid out until the exposed notch comes into registration with the pawl. By appropriately selecting the amounts of the cables on the rotary means the arrangement can be such that when the controlled device is moved to one limiting position a notch is exposed and brought into registration with a pawl for positively preventing any further rotation and similarly when the controlled device is moved to the other limiting position the other notch is exposed and brought into registration with the other pawl whilst in all intermediate positions the rotary assembly is free for movement in either direction.

In order that the present invention may be well understood some specific embodiments will now be described, by way of examples only and with reference to the accompanying drawings in which:

Figure 11 shows one form of mechanism disposed for actuating a bottom-hung window, Referring to Figures 1 to 6, the control mechanism comprises a winch unit generally designated by numeral 1 at the control station and an angularly movable and reciprocable window stay 2 at the controlled end of the mechanism. The said stay 2 is of channel section and is slidably mounted in a carriage 3, said carriage being itself pivotally mounted on a pivot pin 4 which extends from a terminal unit 5. The said terminal unit 5 is recessed to accommodate the carriage 3 and it also affords accommodation for the hereinafter described cables.

Figures 1, 2:
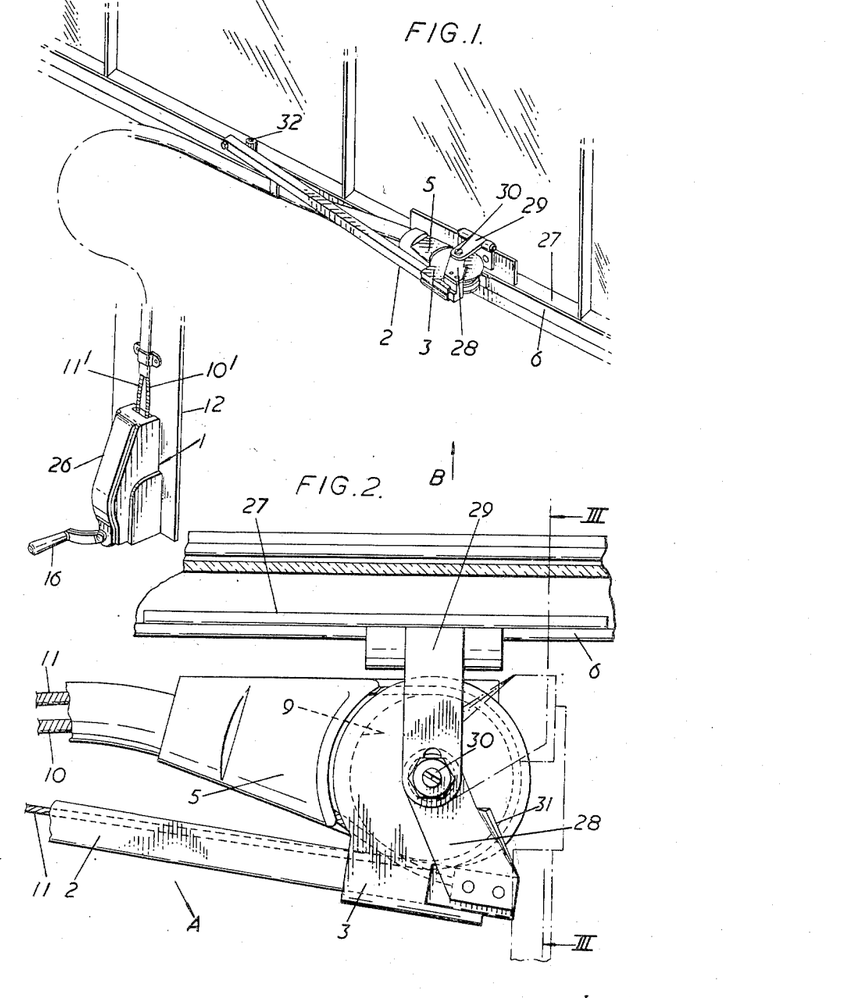
Figure 1 is a somewhat diagrammatic broken perspective view of one form of control mechanism adapted for operating a top-hung window.
Figure 2 is a top plan view showing on an enlarged scale the out-put end of the control mechanism, the window being in the closed position.
Figures 3, 4:
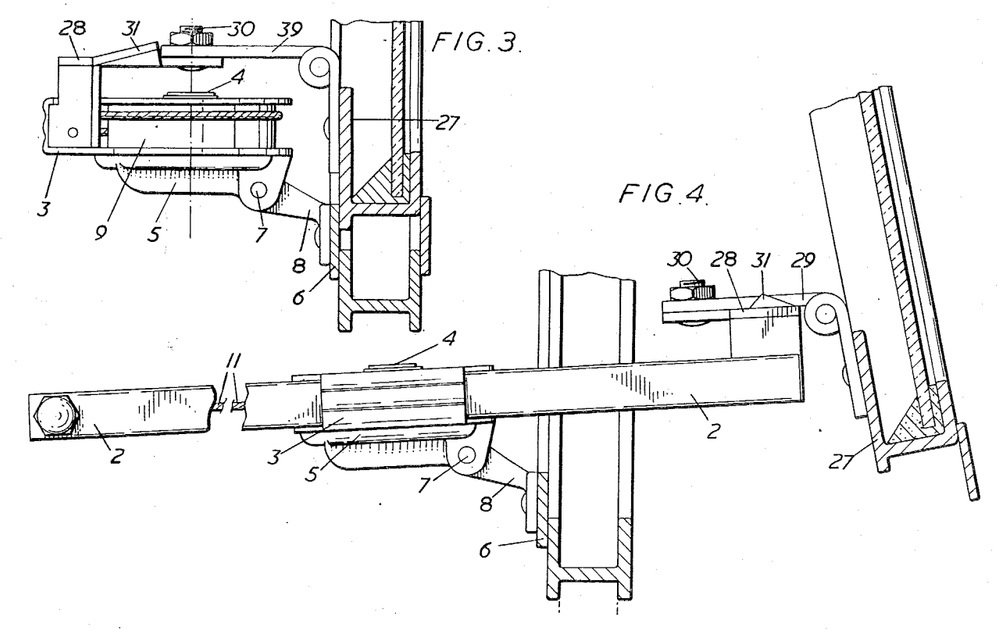
Figure 3 is an end sectional elevation taken on the line III—III of Figure 2.
Figure 4 is a view similar to that of Figure 3 but showing the window and associated control mechanism in a partly opened condition.

The terminal unit 5 is attached to a fixed part, e. g. the window frame 6 in such a manner as to permit of rocking movements in a vertical direction, e. g. such unit may be attached by means of a pivot pin 7 to a bracket 8 secured to the said window frame.

A roller 9 is located within the carriage 5, and is rotatably mounted on the aforesaid pin 4, such roller serving as a guide for two cables 10 and 11, located in coiled wire casings 10' and 11', one of which extends from one end of the window stay 2 to the rotary control winch 1 and the other extends from the other end of the window stay 2 to the said winch, the disposition at the winch end being such that rotation of the winch in one direction within its range of movement results in the taking up of one cable and the paying out of the other one by an equal amount.

Figures 5, 6:
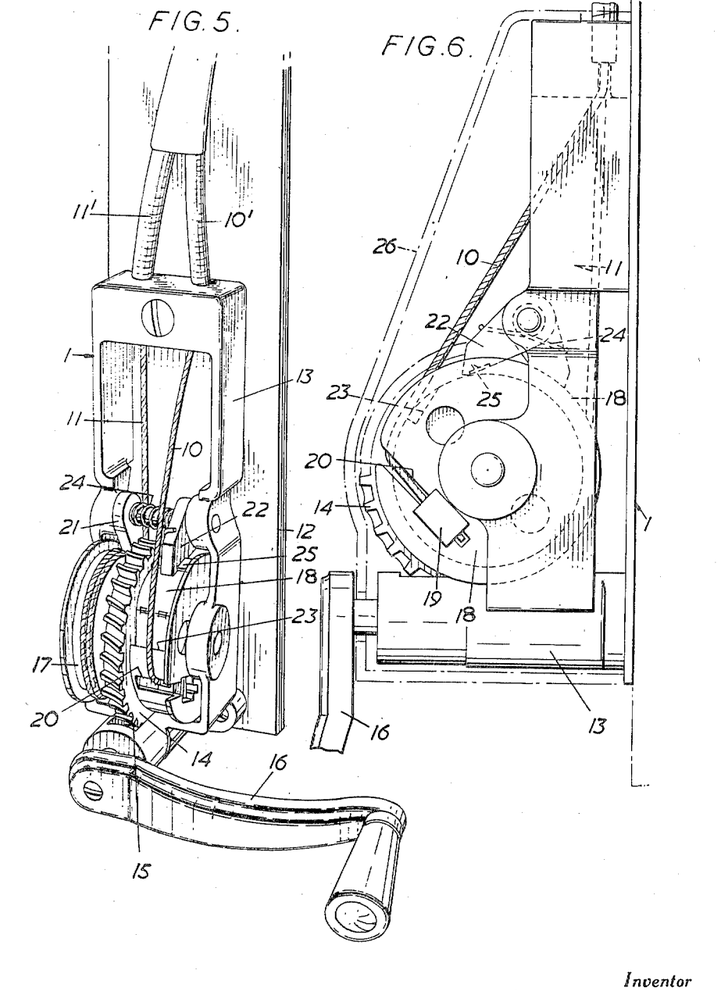
Figure 5 is an enlarged perspective view of the in-put end of the control mechanism shown in Figure 1 but with a cover plate removed to expose internal parts.
Figure 6 is a side view of the mechanism shown in Figure 5.

The winch unit 1 comprises a base plate 12 on which is located a frame 13 housing a rotatably mounted drum unit for engagement by the aforesaid cables, such drum unit being itself driven by a worm wheel 14 engaging a worm 15 housed in the frame 13, and having a spindle to which an operating crank handle 16 is fitted.

The aforesaid drum unit may comprise drum portions 17 and 18 for engagement by the cables 10 and 11 respectively and said drum portions and the centrally disposed worm wheel 14 may be integrally formed. It is preferred however to make the said drum portions and worm wheel as separate components and to provide for their being fixedly secured together in various angular positions so as to provide for any necessary adjustments in the relative positions of the two cables.

The ends of the cables 10 and 11 may be secured to the aforesaid drum portions in any convenient manner but it is preferred to effect this by means of terminal blocks 19 which are insertable into recesses in the end faces of the said drum portions, such recesses having exit channels 20 for enabling the cables to pass to the periphery of the drum and the cables being anchored to the terminal units for instance by set screws passing into bores provided for receiving the cable ends.

In order to prevent undue strain being applied to the aforesaid cables, such for instance as would be the case by rotating the winch beyond the position which corresponds to one of the cables being fully wound in, positive stop means are provided. In the arrangement shown in detail in Figures 5 and 6 these stop means comprise two oppositely acting pawls 21 and 22, the pawl 22 being disposed for co-operation with a notch 23 in the drum portion 18 in preventing rotation of the drum unit beyond a limiting position in a clockwise direction as viewed in Figures 5 and 6, and the pawl 21 being disposed for co-operation with a corresponding notch in the drum portion 17 in preventing the drum unit from rotating beyond a limiting position in an anti-clockwise direction as viewed in the said figures. The said pawls 21 and 22 are resiliently urged towards the associated drum portions by means of a spring 24.

In many cases it will be necessary for the drum unit to turn through more than one revolution and this means that in certain positions the aforesaid stop means must be inoperative although positioned for engagement. In the arrangement illustrated this object is achieved by providing the aforesaid notches in that surface with which the cables make engagement so that if the wound-up portion of the cable extends over the notch then the pawl is prevented from entering into engagement therewith and the drum unit is free to be rotated in both directions. In order to ensure that in such circumstances the pawl cannot pass the side of the cable the said pawls may be provided with transverse plates, such as the plate 25 shown in Figures 5 and 6 in association with the pawl 22, which completely fill the space for accommodating the said cables.

The working parts of the above described winch are enclosed within a cover 26 which is shown in full lines in Figure 1 and in chain lines in Figure 6.

The end of the window stay 2 remote from the free end thereof is pivotally connected to the movable frame 27 of the window proper by means of a bracket 28 rigidly secured to the said stay and a hinged bracket 29 of which one part is rigidly secured to the said window and the other part is pivotally connected to the said bracket 28 by means of a pivot pin 30.

The aforesaid bracket 28 is provided with an upwardly extending lug 31 for co-operation with the part of the bracket 29 which is pivotally connected thereto in forming a stop which prevents the stay 2 from swinging from the nested position shown in Figure 2 to a position beyond a position of right-angles with respect to the window, such last mentioned position being shown in Figure 4.

The aforesaid brackets 28 and 29 are so disposed that the pivotal axis therebetween is disposed concentrically with respect to the pivotal axis of the carriage 3 when the window stay 2 is moved into a position fully closing the window 27, i. e. the position shown in Figure 2, and in those circumstances the stay and carriage can be moved angularly as a unit assembly, i. e. rotation of the winch will cause the carriage and stay to swing from the nested position shown in Figure 2 to a position in which the said stay projects at right-angles. Assuming however that turning of the winch is continued in the same sense but after the stay has been swung in the direction of the arrow A in Figure 2 into the said position in which the stay projects at right angles to the window the pull on the cable 11 will cause the stay to slide with respect to its carriage so moving the pivotal axis of the stay out of a condition of concentricity with the pivotal axis of the carriage when any pivotal movement of said parts is prevented but sliding movement of the stay will cause the window 27 to open in the direction of the arrow B also shown in Figure 2. It is possible therefore by rotation of the winch 1 to swing the window stay into and out of the nested position shown in Figure 2 and also to cause it to slide with respect to its carriage to effect opening of the window 27 to any desired extent.

In order to remove any danger of the aforesaid stay hitting the glass of the associated window a stop 32 (see Figure 1) may be fitted to the fixed part of the frame, such stop preferably being covered with resilient material.

It will be observed that in Figure 2 the window stay 2 is shown in a nested position in which it extends slightly inwardly towards the window as it progresses from its pivoted end towards its free end. This is desirable from the point of view of security as it ensures that any attempt to force the window from its closed position cannot be resolved into a force tending to swing the stay in the direction of the arrow A. The window is therefore proof against being forced unless indeed the window or its control mechanism is first broken.

Owing to inevitable back-lash between the various moving parts it will be found that in general rotation of the winch in a closing direction results in the window stay 2 starting to swing towards its nested position just before the pivotal axis of the said stay and the pivotal axis of the carriage 3 are in a condition of concentricity but any such swinging of the stay generates a strong cam action tending to attain such condition of concentricity with the result that there is a strong action tending to draw the window into a very tightly closed condition.

It will be appreciated that opening and closing movements of the window 27 about its upper hinge will vary the inclination of that part of the bracket 29 which is secured thereto but that it is always necessary for the pivotally interconnected parts of the brackets 28 and 29 to remain in parallel planes which means that the relevant part of the bracket 28 and the carriage and stay assembly must be free to rock about horizontal axes and such rocking movement is readily accommodated by the hinge pin 7 and the hinged construction of the bracket 29.

In the arrangement shown in Figure 7 there is again shown a channelled window stay 2 slidable in a carriage 3 which is pivotally mounted on a bracket secured to the fixed part 6 of a window frame and the stay is pivotally connected at one end to the movable part 27 of a top-hung window. The swinging and sliding movements of the said stay are again effected by pulling on the cables 10 and 11 but there are two changes as compared with the embodiment described with reference to Figures 1 to 6. In the first place instead of providing a winch for exerting a pull on the desired cable, both cables terminate in pull handles 33 and 34, disposed for direct manual operation. In the second place the stay 2 is connected to the movable part of the window not by means of a pivotal connection to a hinged bracket but by means of an arcuate rod 35 which projects from the stay 2 through an eyelet 36 secured to the movable part 27 of the window, the axis about which the arc of the rod 35 is struck being disposed for being in a position of concentricity with respect to the pivotal axis of the carriage 3 when the stay 2 is moved to the window-closed position. As in the earlier arrangement, the stay and carriage can accordingly swing about a common axis when the window is closed, so enabling the stay to be moved into and from its nested position at will but when the stay slides from that position then no swinging movement is possible and pull on the appropriate cable will only cause opening or closing of the windows. During the said pivotal movement the above mentioned arm 35 will slide with respect to the eyelet 36 and it will also be free for rocking with respect thereto thus accommodating the pivotal movement of the window itself. The arrangement shown in Figure 7 exposes the interior of the channelled window stay and one mode of anchoring the ends of the associated cables which involves the use of terminal blocks 37 and 38 which are bolted or otherwise secured to the stay and have set screws extending into bores receiving the cable ends.

Figures 7, 8:
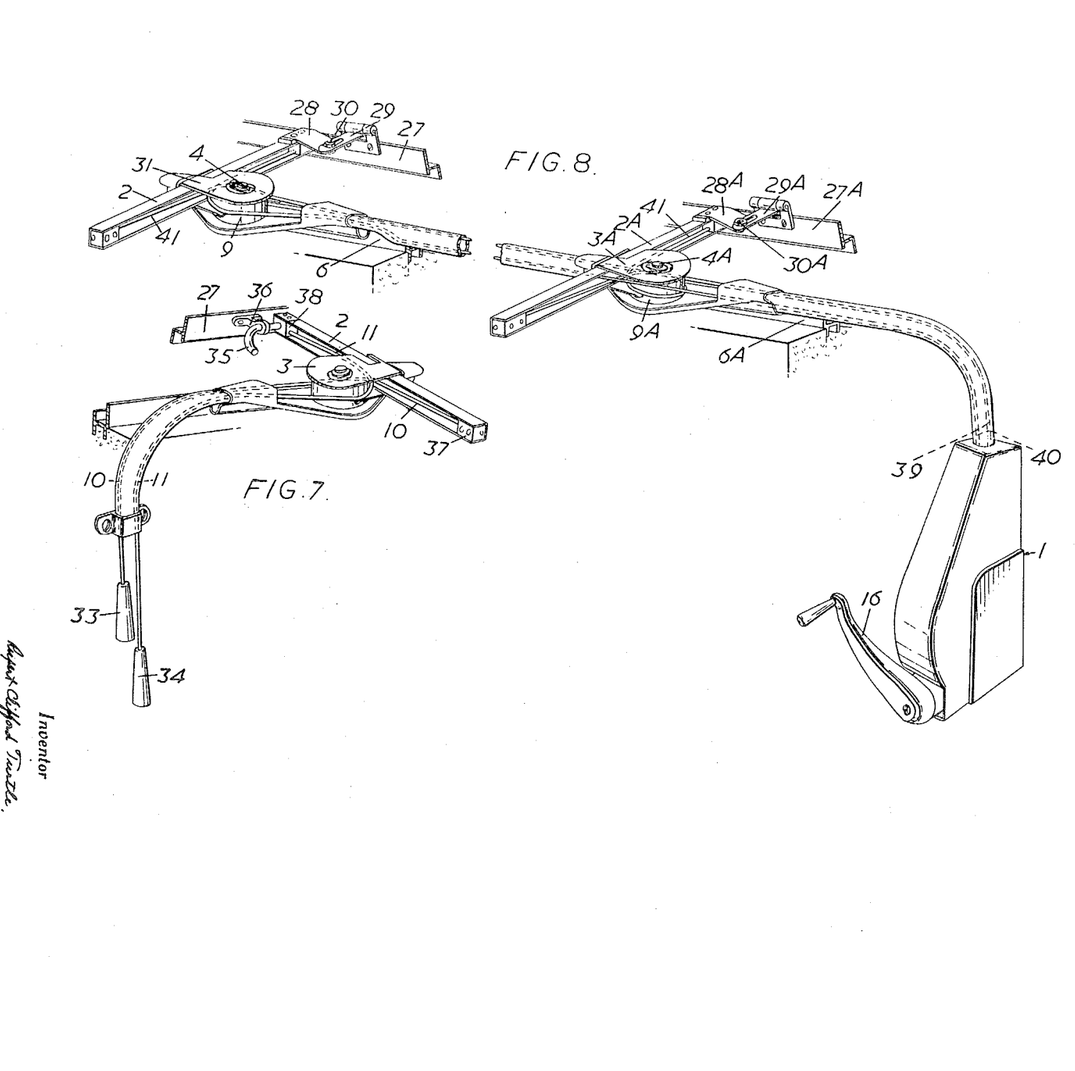
Figure 7 is a somewhat diagrammatic perspective view of another form of pivotal mounting, for the window stay, and such figure also shows a modification in the drive input arrangement at the control end of the mechanism.
Figure 8 is a somewhat diagrammatic perspective view of one way in which a series of windows may be actuated by common control mechanism in accordance with the present invention.

Referring now to Figure 8, there is shown one way in which a series of window stays can be operated from a common control station. In this arrangement each window unit is similar to that already described with reference to Figures 1 to 6 with the small difference that the stays are disposed for swinging from left to right in attaining their nested conditions. Corresponding parts of the two control mechanisms fitted to the two windows are accordingly designated in the case of one of the units by the same reference numerals as those already used for corresponding parts and in the case of the second unit by the same reference numerals accompanied by the index letter A. The control station includes a winch which is again similar to that already described and accordingly designated by similar reference numerals. There are also two cables disposed for being wound onto the winch pursuant to rotation thereof in opposite direction but the cable disposition differs from that already described and will now be explained in detail. The cable 39 extends from the winch and thence around the pulley 9A to the near end of the stay 2A as viewed in Figure 8 whilst the second cable 40 extends from the winch and thence around the pulley 9 to the far end of the stay 2 as viewed in the said figure, and there is a third cable 41 which extends from the far end of the stay 2A and thence around the pulley 9A and the pulley 9 to the near end of the stay 2. The aforesaid cable 39 is disposed for being drawn in by rotation of the winch drum in an anti-clockwise direction as viewed in Figure 1 whilst the cable 40 is disposed for being drawn in pursuant to rotation of the winch drum in the opposite direction. The operation of this arrangement with the parts shown in Figure 8, i. e. with the windows in a partially opened condition is as follows. If the winch is rotated in an anti-clockwise direction cable 39 is wound in thus urging the window stay 2A in a window-opening direction, this movement of the stay 2A applies tension to the cable 41 and this imparts a corresponding window-opening movement to the window stay 2 and window 27. If however the winch is rotated in the opposite direction then the cable 40 is wound in by the winch thus positively causing the window stay 2 to move in a window closing direction and this movement is transmitted by the cable 41 to the window stay 2A which is correspondingly moved. When the windows have been fully closed continued rotation of the winch in the same direction will further take in the cable 40 thus causing the stay 2 and with it the carriage 3 to pivot into the nested position and such pivotal movement will further take in the cable 41 so also causing the stay 2A and carriage 3A to swing to their nested positions, and in all cases the extent to which the cable 40 is taken up or paid out by the winch will be equalled by the extent to which the cable 39 is paid out or taken up and the cable 41 also moves in unison so imparting uniform and positive movement to all of the window stays. It will be appreciated that a similar arrangement can be adopted in the case of a series of more than two windows, i. e. rotation of the winch in one direction positively moves one of the end stays of the series in one direction, rotation in the opposite direction positively moves the other end stay in the opposite direction and the other required movement of the end stays and both movements of the intermediate stays are effected by intermediate cables extending between adjacent pairs of stays.

Figure 9:
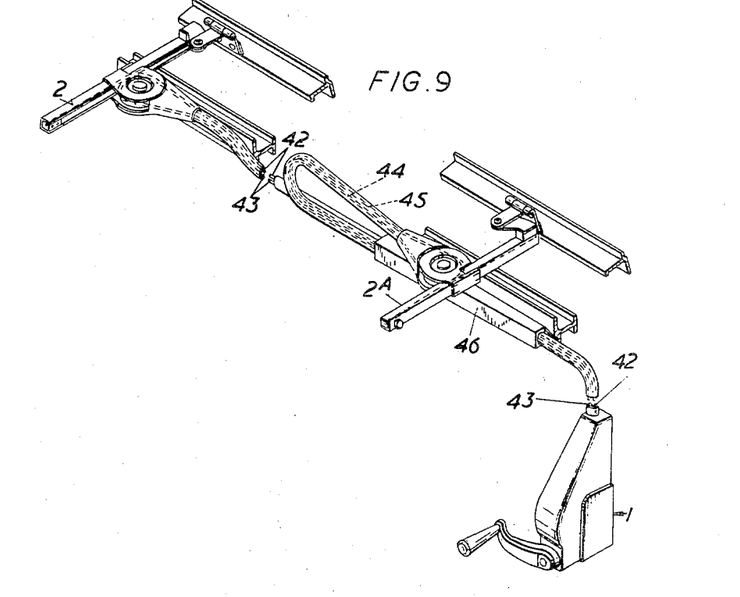
Figure 9 is a somewhat diagrammatic perspective view of another way in which a series of windows can be operated from a control station in accordance with the present invention.
Figure 10:
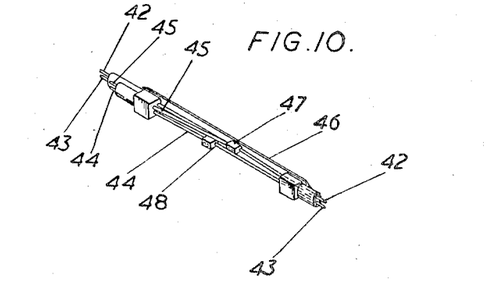
Figure 10 is a detail view of part of the mechanism shown in Figure 9.

Referring now to Figures 9 and 10 the arrangement is similar to that described with reference to Figure 8 so far as the units secured to the windows are concerned subject only to the stays swinging from right to left in moving to their nested positions and similar reference numerals are accordingly used for corresponding parts. The control station again comprises a winch similar to that already described but the cable disposition differs in that the two cables extending from the winch and now designated 42 and 43 lead to a single window unit, e. g. the window stay 2, and the cables 44 and 45 for actuating the window stay 2A lead from a branch unit 46 associated with the cables 42 and 43. This branch unit 46 comprises a base and removable cover portion forming a housing for the cables 42 and 43 and connection elements 47 and 48 clamped respectively to the cables 42 and 43 and to the ends of the respective cables 45 and 44 so that a pull on cable 43 generates a pull on cable 44 whilst a pull on cable 42 generates a pull on cable 45. Here again therefore actuation of the winch imparts positive and synchronous movement of the several windows in opening and closing directions as well as synchronous movement of the several window stays into and from their nested positions by what might be called a parallel disposition of the drive as opposed to the series disposition of the arrangement shown in Figure 8. It will be readily understood that the last described arrangement may be adapted for operating further windows by providing additional branch units for association either with the cables 42 and 43 or with the cables 44 and 45, the former being in general preferable.

Figure 11:
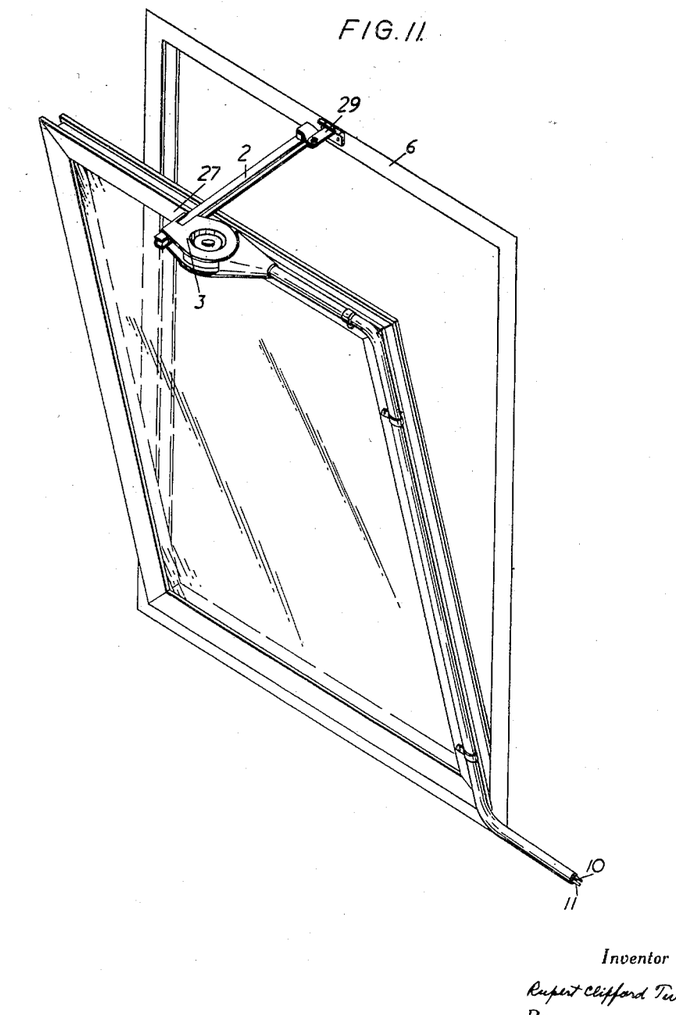

Referring now to Figure 11 there is shown one arrangement adapted for the control of a bottom-hung inwardly swinging window. This arrangement closely follows the arrangement described with reference to Figures 1 to 6 in the sense that there is a pivotable window stay 2 and associated carriage 3 assembly similar to those already described but the hinged bracket 29 to which the stay is pivoted is now secured to the fixed part 6 of the window frame and the carriage 3 through which the stay slides is pivotably and rockably mounted on the movable part 27 of the window. This of course means that the cables 10 and 11 associated with the window unit must swing with the window but such movement is readily accommodated by using a flexible housing for the cables and so arranging the conduit that the point at which junction with the moving frame is effected is at or closely adjacent to the pivotal axis of the window. If it is desired to operate a series of bottom-hung windows then the cable disposition may be in conformity with either of the already described series or parallel arrangements.

Whilst some preferred embodiments of the present invention have been hereinbefore described it is to be understood that there may be various changes without departing from the scope of such invention. Thus for instance the control mechanism is applicable not only to windows but also for instance to louvres, dampers or the like. Moreover the element to be controlled instead of being top-hung or bottom-hung, may be mounted for pivotal movement about an intermediate horizontal axis or about a vertical axis. Moreover in the case of ganged operation the control unit instead of being located at one end of the series of elements to be controlled may be located in an intermediate position.

I claim:

1. A mechanism for effecting movement of one member relative to another member comprising a carriage secured to the first of said members, said carriage being pivotally mounted about a pivot axis and having a roller rotatably mounted therein for rotation about an axis coincident with said carriage pivot axis, a bar slidably mounted within said carriage and adapted for longitudinal reciprocatory movement therein, one end of said bar being pivotally secured to the second of said members, cable means for adjusting the angular position of said members relative to each other, said cable means including a first cable secured to one end of said bar and a second cable secured to the other end of said bar, said cables passing in opposite directions around said roller, control means for applying tension to either cable at will, said pivot connection of said bar to said second member being so disposed that in the closed position of said members said connection is coaxial with respect to said carriage pivot axis, whereby in the closed position of said members and pursuant to an increase in tension on the appropriate cable said carriage and bar may be moved angularly about the pivotal axis from a position nesting against said members to a position extending substantially at right angles to said members and the position of said bar within said carriage being then varied to effect to any desired extent the angular positioning of said members with respect to each other.

2. A mechanism for effecting movement of one member relative to another member as defined in claim 1 wherein said carriage, bar, and pivot connections are so arranged as to provide upon closing of said members a strong camming action to effect a very tightly closed final condition of the members.

3. A mechanism for effecting movement of one member relative to another member as defined in claim 1 wherein one member is a window frame and the other member is a window pivotally secured to said frame, said carriage being pivotally mounted on said frame and said bar being pivotally connected to said window.

4. A mechanism for effecting movement of one member relative to another member as defined in claim 1 wherein one member is a window frame and the other member is a window pivotally secured at its lower edge to said frame, said carriage being pivotally mounted on the upper edge of said window and said bar being pivotally connected to said window frame.

5. A mechanism for effecting movement of one member relative to another member as defined in claim 1, wherein the pivotal connections of said bar to said first member and said carriage to said second member include additional pivotal means providing limited rocking movement about axes at right angles to the axes of said pivotal connections so that said carriage and said bar will be maintained in planes which are parallel to one another notwithstanding angular movement of said members relative to each other.

6. A mechanism for effecting movement of one member relative to another member as defined in claim 1 wherein said carriage and bar are pivotable between limiting positions in one of which said bar is disposed for reciprocatory movement with respect to said carriage and in the other of which it is displaced from the first named position through an angle slightly exceeding ninety degrees.

7. A mechanism for effecting movement of one member relative to another member as defined in claim 1 wherein said carriage has a U-shaped frame and is adapted to receive the said roller between its webs, there being a space between the root of the U-shaped frame and the periphery of the roller for slidably receiving said bar.

8. A mechanism for the opening and closing of windows pivotally mounted within window frames as defined in claim 1 and having a plurality of said carriage, bar and roller assemblies disposed for actuating a series of windows to be controlled from a common control station, the cable connection to one end of one bar of the series of bars passing to said control station, the cable connection to the other end of the said bar also passing to said control station, and the cable connections to the corresponding ends of the other bars coupled to appropriate parts of the said cables extending to the control station, the arrangement being in the nature of a parallel control in that all of the bars are actuated by branches from the two main cables.

References Cited in the file of this patent

UNITED STATES PATENTS

| | | |
|---|---|---|
| 1,356,803 | Workman | Oct. 26, 1920 |
| 2,652,245 | Bentley | Sept. 15, 1953 |